United States Patent [19]

Ho

[11] Patent Number: 4,747,058
[45] Date of Patent: May 24, 1988

[54] CODE LINE DISPLAY SYSTEM

[75] Inventor: Benedict C. M. Ho, Waterloo, Canada

[73] Assignee: NCR Corporation, Dayton, Ohio

[21] Appl. No.: 941,976

[22] Filed: Dec. 15, 1986

[51] Int. Cl.$^4$ .............................................. G06K 5/00
[52] U.S. Cl. ................................... 364/478; 235/437; 235/379; 340/518; 382/57; 209/939
[58] Field of Search ................ 364/478; 235/437, 475, 235/476, 379; 382/57; 340/518, 524, 525; 209/552, 569, 583, 939

[56] References Cited

U.S. PATENT DOCUMENTS 4,068,212 1/1978 Templeton ...................... 340/146.3
4,564,752 1/1986 Lepic et al. ........................ 235/437

Primary Examiner—Michael R. Fleming
Assistant Examiner—Allen MacDonald
Attorney, Agent, or Firm—Wilbert Hawk, Jr.; Albert L. Sessler, Jr.; Elmer Wargo

[57] ABSTRACT

A document processing system for reading a line of MICR data from documents passing along a document track and for generating a marker to be positioned over a character which was not read properly when that line of MICR data is presented on a display. A special thresholding circuit is used to convert the image data of the line of MICR data to binary data. The circuit automatically adjusts for changes in light intensity at the associated scanning line where the image data is generated.

19 Claims, 6 Drawing Sheets

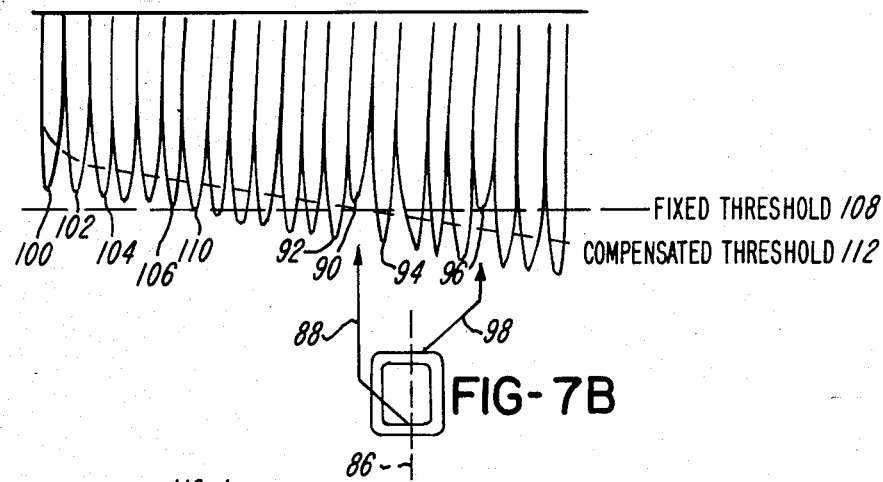
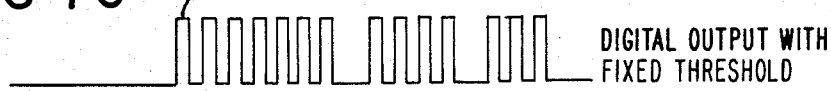
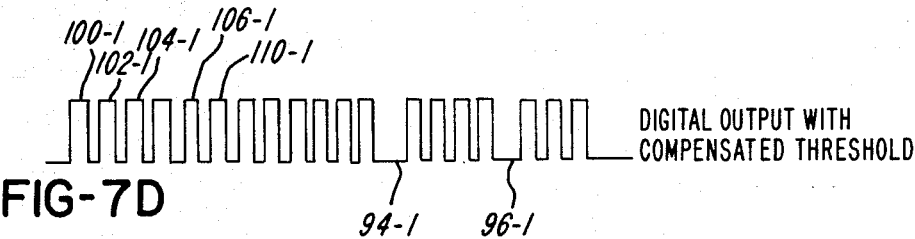

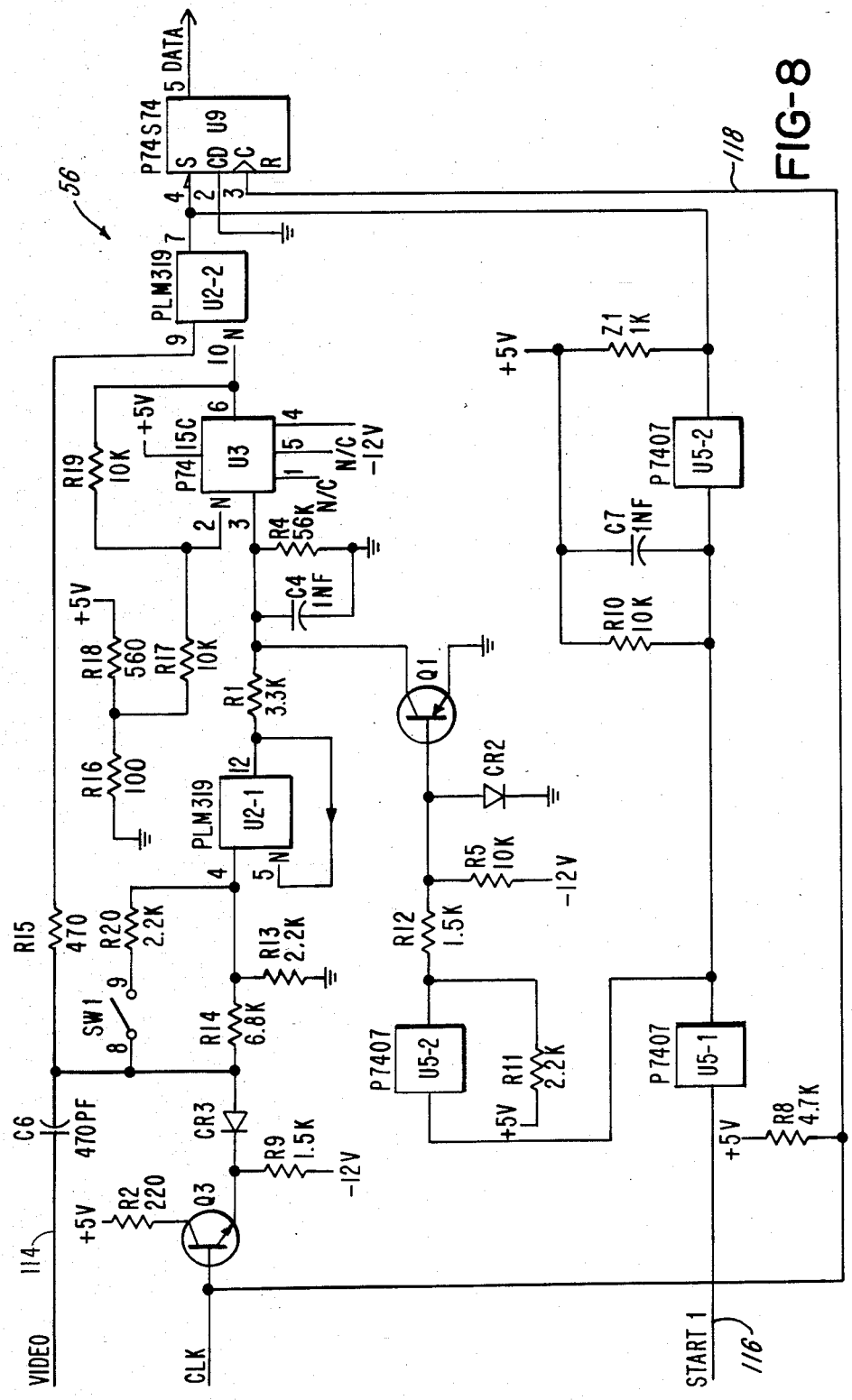

CODE LINE DISPLAY SYSTEM

BACKGROUND OF THE INVENTION

This invention relates to a system for processing documents like checks and deposit slips, for example, and in particular, it relates to a system which facilitates the entry of data which has not been machine read correctly.

During the processing of documents, like checks for example, in a financial environment, a point is reached in this processing at which a line of characters on each of the documents is read by a machine. For example, a MICR (Magnetic Ink Character Recognition) line of characters on each document is read by a MICR reader. If the document has been folded or scratched at the line of characters, it is possible that a particular character or characters may not be read properly by the MICR reader. One way of solving this problem is to have an operator physically look at the affected document and enter (via a data entry keyboard) the correct character in the correct location along the line of characters.

Another way of solving this problem is to utilize the image of the document instead of the actual document itself. In this regard, an operator looks at the image of the line of characters on a display and checks the image with the characters which have been read electrically or mechanically. Some prior art schemes exist for highlighting on the visual display the character or characters which has or have not been read properly to thereby facilitate the manual entry of the correct character data.

SUMMARY OF THE INVENTION

A first preferred embodiment of the document processing system made according to this invention includes a document track and moving means for moving documents in a feeding direction at a constant velocity serially in spaced relation along said document track; reading means for reading a line of character data from said documents being moved in said document track; an imaging means positioned downstream along said feeding direction from said read head for generating image data of at least a portion of each of said documents including said line of character data passing said reading means; said reading means including a read head and a read circuit for determining when a particular character in said line of character data on a document is not read correctly and for issuing a reject signal in response thereto; a display circuit for receiving said image data from said imaging means and for converting said image data to binary data; said display circuit also receiving said reject signal and generating a marker which indicates the position in said binary data of a rejected character in said line of character data; a buffer for storing said binary data and said marker for each said document; and a display for displaying said binary data and said marker for a said line of character data to facilitate the entry of data; said display circuit also including means for delaying each said reject signal by a fixed amount of time which corresponds to the time that a location on a said document takes in being moved physically from said reading means to said imaging means to enable said marker to be positioned over the corresponding said rejected character when displayed on said display.

A second preferred embodiment of this invention includes that which is included in the first embodiment, and in addition, it includes an optical imaging means for imaging the portion of document where the monetary amount is usually found. In this embodiment, either the MICR line of data or the monetary amount of a document may be displayed on the display.

A feature of this invention is that it facilitates the entry of data into a document processing system.

Another feature of this invention is that it provides a compact, optical imaging means.

Another feature of this invention is that it provides a thresholding circuit which compensates for variations in light intensity along the scanning line of the imaging means.

These features and other advantages will be more readily understood in connection with the following specification, claims and drawing.

BRIEF DESCRIPTION OF THE DRAWING

FIG. 7A is a waveform representing the output of a scanning line when scanning a character whose shape is shown in FIG. 7B;

FIG. 7C is a waveform representing a digital output for a scanning line obtained when using a fixed threshold;

FIG. 7D is a waveform representing a digital output obtained when using the threshold circuit shown in FIG. 3;

FIG. 8 is a detailed schematic diagram of the threshold circuit shown in FIG. 3.

DETAILED DESCRIPTION OF THE INVENTION

Figure 1:
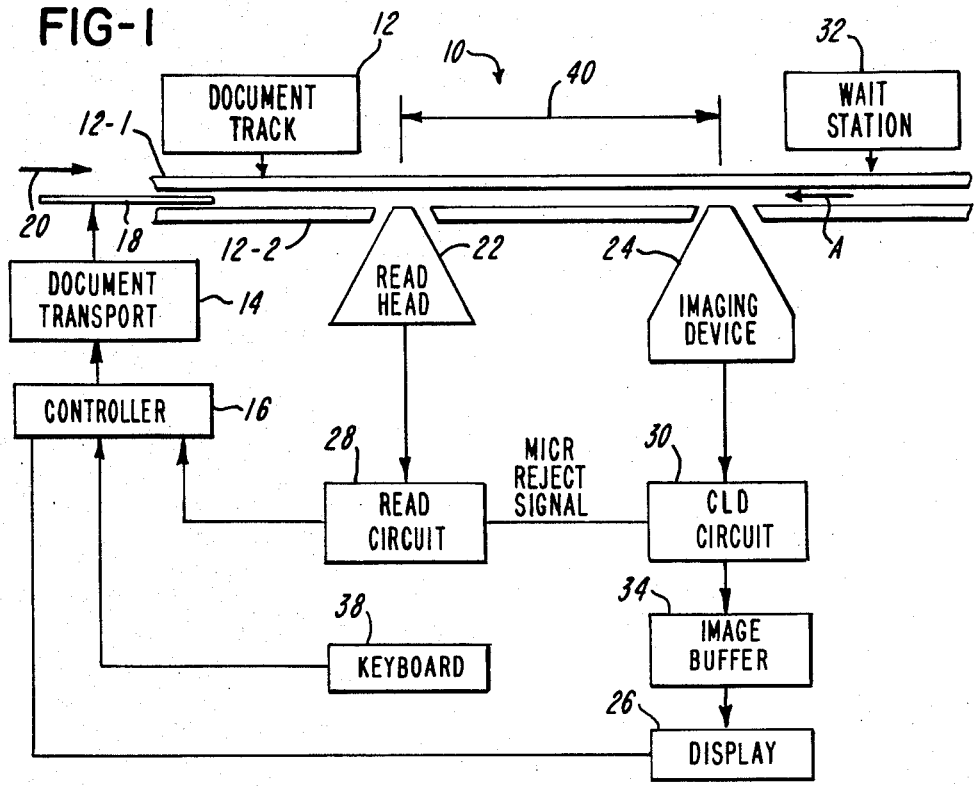
FIG. 1 is a general plan view of a first embodiment of this invention showing a system, in diagrammatic form, for processing documents like checks, for example.

FIG. 1 shows a first embodiment of a document processing system 10 made according to this invention. The system 10 includes a document track 12 which includes the vertically-upstanding walls 12-1 and 12-2, and it also includes a document transport 14 which is under the control of the controller 16. The document transport 14 conventionally moves the documents, like 18, at a constant velocity, serially, and in spaced relation along the document track 12. The documents 18 may be checks or deposit slips, for example, which are processed at a financial institution, like a bank. For example, the documents 18 may have MICR data (Magnetic Ink Character Recognition) which is already included on the documents 18. This MICR data may include the customer account number, bank number, etc., and the monetary amount of the document 18. Generally, this information is located close to the long, bottom edge of the document for use in processing checks, for example.

As the documents 18 are moved on their long, lower edges, with the top, long edge being viewed in FIG. 1, each document 18 is moved in the direction of arrow 20 by the document transport 14 to the read head 22. In the embodiment described, the read head 22 is a conventional MICR reader which is positioned in reading relationship with the MICR line of data on the documents 18 as is conventionally done.

An imaging device 24 (FIG. 1) is located downstream from the read head 22 as viewed from the direction of arrow 20. The image of the MICR line of data on a document 18 is viewed on the display 26 to facilitate the entry of data when MICR data on the document 18 is not read or is misread by the read head 22. For example, if a document 18 is folded or scratched along the MICR line, the read head 22 may not be able to machine read the characters on the MICR line correctly. A conventional read circuit 28 receives the output from the read head 22 and forwards the output to the controller 16. When a character in the MICR line is not read properly, a reject signal is generated for that particular character. The reject signal is forwarded to a Code Line Display (CLD) circuit 30 which will be described hereinafter For the present time, it is sufficient to state that the reject signal is also used by the controller 16 to stop the corresponding document 18 at the wait station 32 after the document 18 passes the imaging device 24.

The image data coming from the imaging device 24 (FIG. 1) is fed to the CLD circuit 30 where it is processed. Part of the processing at the CLD circuit 30 relates to marking the image data associated with the character or characters which was or were rejected by the read circuit 28 and thereafter, placing this digital data in an image buffer 34. From the image buffer 34, the image data associated with a rejected document 18 is displayed on the display 26 (FIG. 2).

Figure 2:
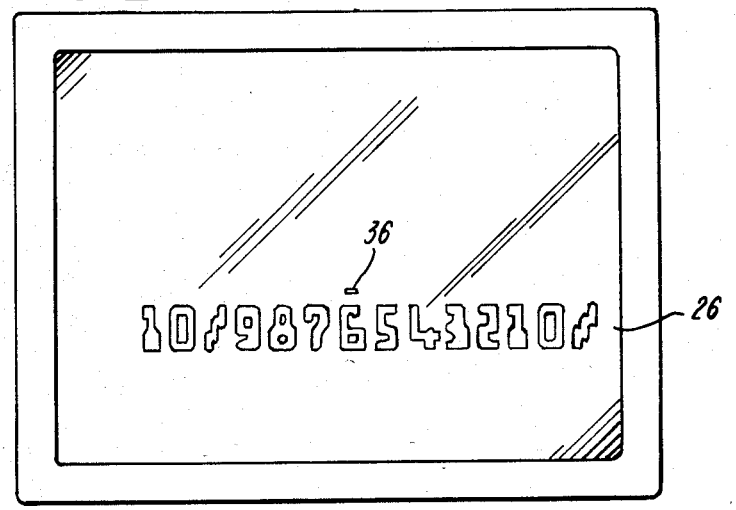
FIG. 2 is a pictorial view of the display shown in FIG. 1, showing a line of characters being displayed with a marker positioned over the character which is not read properly.

In the example displayed in FIG. 2, the character which was not read correctly is the number which occupies the position occupied by the number "6" which has the marker 36 positioned above it. The marker 36 highlights the character for an operator who then reads the display 26 and enters the number "6" on the keyboard 38. At this moment, the associated document 18 is physically located at the wait station 32. After entering the number "6" on the keyboard 38, the controller 16 uses this entered data to complete the misread data for the document 18 being discussed. Conventional application software associated with the controller 16 is used to manipulate the transactions between the display 26, keyboard 38, and the controller 16. For example, after the correction for the number "6" is entered as described, the operator then presses a first or "enter" key, for example, which will cause the cursor (not shown) on the display to move to a second rejected character (if more than one rejected character occurs in the reject line). All the rejected characters for a document are highlighted on the display 26 at one time. The correction is made as described, and thereafter, a second or any other key may be actuated to present the next document 18 for reading and correction as described. The corrected data which is entered on the keyboard 38 is utilized by the controller 16 to present a correctly-read line of MICR data to the system 10. As previously stated, when a next document 18 is to be read, the second or any key on the keyboard 38 is actuated. This action causes the controller 16 to actuate the document transport 14 to move the document 18 at the wait station 32 further downstream along the document track 12 for further operations, like sorting, which are not important to an understanding of this invention. The document transport 14 will also move the next document 18 in reading relationship with the read head 22 to repeat the process described.

An important feature of this invention is that the imaging device 24 is positioned downstream from the read head 22 by a precise distance shown by the dimension line 40. In the embodiment described, the distance represented by dimension line 40 is 1.85 inches, and the document transport 14 moves the documents 18 in the track 12 at a constant velocity of 104 inches per second, although other values could be used for different applications. The reject signal coming from the read circuit 28 is delayed by the CLD circuit 30 by a time corresponding to the time that the same point on a document 18 takes in traveling from the read head 22 to the imaging device 24. Naturally, a character must be read first before it is determined that is is a rejected character, and accordingly, the delay introduced by the CLD circuit 30 takes this into consideration. This means that when a rejected character on a document 18 physically reaches the imaging device 24, the rejected character is imaged by the imaging device 24, and the associated digitized image is "tagged" by the "delayed" reject signal to produce the marker 36 above the associated, rejected-character position, as shown in FIG. 2.

Figure 3:
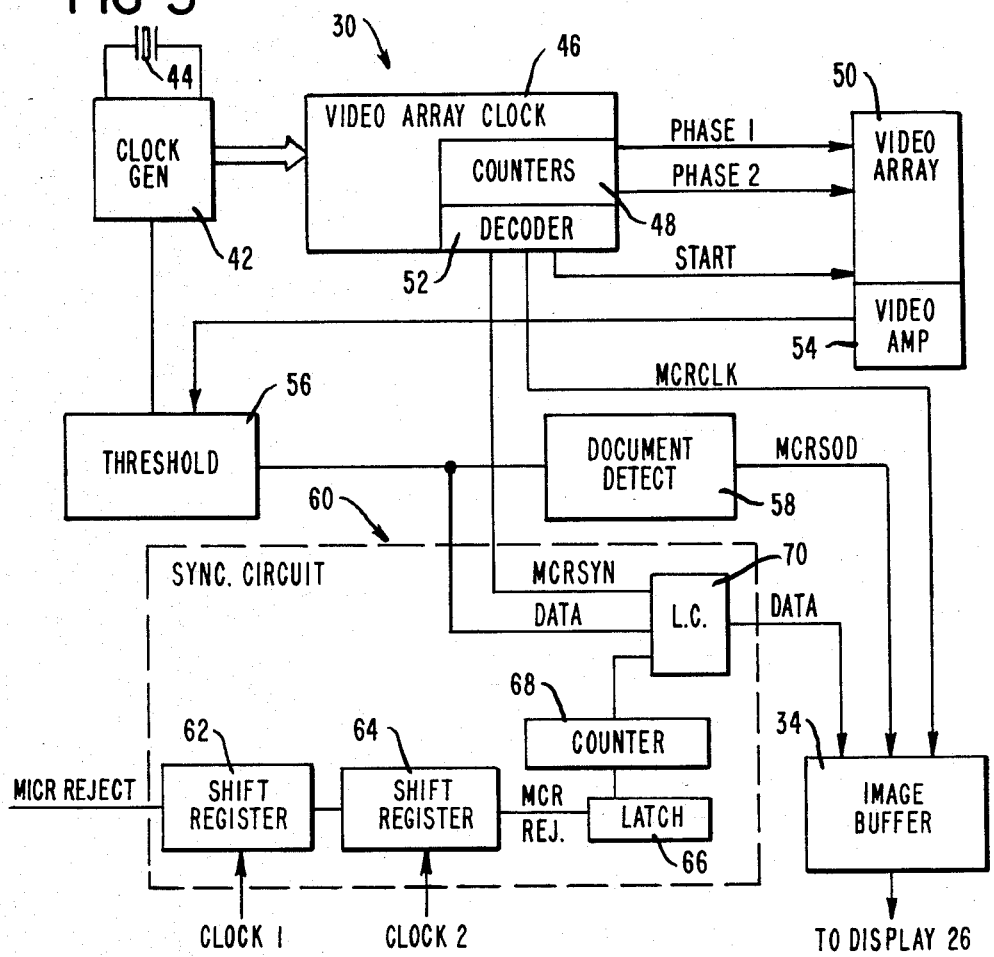
FIG. 3 is a schematic diagram, in block form, of the CLD (Code Line Display) circuit shown in FIG. 1.
Figure 4:
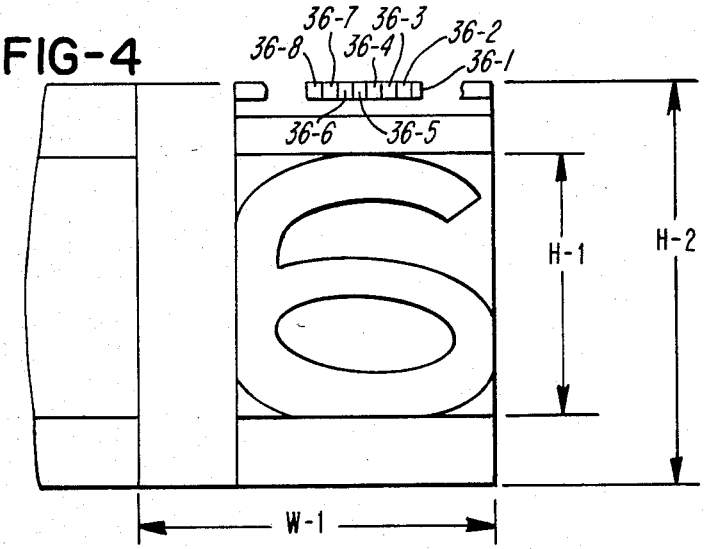
FIG. 4 is an enlarged, diagrammatic view of a character being scanned.

The CLD circuit 30, shown in block diagram in FIG. 1, is shown in more detail in FIG. 3. The CLD circuit 30 includes a standard clock generator 42 having a crystal-controlled oscillator 44 whose oscillating frequency is 1.1 megahertz in the example described. The output of the clock generator 42 is fed to the video array clock 46 which includes "divide by," cascaded counters 48 to provide the phase 1 and phase 2 clocks (at a frequency of 1.1 megahertz) for a video detector array 50 which is part of the imaging device 24 shown in FIG. 1. The array 50 is a standard video detector array such as part #RL-64A, for example, which is manufactured by EG&G Reticon, Inc. In the embodiment described, the height of scanning line is about 0.4 inch and is shown by dimension line H-2 in FIG. 4. The character "6" shown in FIG. 4 is not drawn accurately or to scale and is exaggerated in size simply to illustrate certain aspects of this invention. The actual height of a character is 0.125 inch for MICR data, and it is shown by dimension line H-1 in FIG. 4. Sixty-four picture elements or pixels occur in each scan line by the video array 50, and this is represented by the dimension line H-2 in FIG. 4. A clock pulse like a phase 1 or a phase 2 pulse is used for each of the 64 pixels in a scan line (shown by H-2), and an additional two clock pulses are used for the CLD electronics 30 to start scanning again at the bottom of the scan line after having received the top-most pixel from the array 50. The 63rd pixel in the scan line is always left blank and the 64th or top-most pixel shown in FIG. 4 is reserved for the marker 36 shown in FIG. 2. This 64th pixel is derived in combination with other signals to be explained hereinafter.

The video array clock 46 (FIG. 3) also includes a conventional decoder 52 which produces an output called "Start" when the counters 48 reach a count of 66 while also providing the 64 clocks for the array 50. The Start signal coming from the decoder 52 is used to start the scanning by the array 50 which scans from the bottom to the top as viewed in FIG. 4. Assuming that the document 18 is moved from left to right (as viewed in FIG. 1), each of the characters being scanned is scanned first from the leading or right side of the character (as viewed in FIG. 4) while working towards the left side. For MICR data, each character is fitted into a character cell, with the cell having a width of W-1 as shown in FIG. 4. The cell extends from the leading edge of one character to the leading edge of the following character as shown by the dimension W-1. In the embodiment described, the cell width or dimension W-1 is covered or traversed by 20 scans from the video array 50 as the document 18 is moved past the imaging device 24.

The output of the video array 50 is amplified by a conventional video amplifier 54 (FIG. 3) and forwarded to a threshold circuit 56. In general, the output of the array 50 consists of an analog value for each pixel, and the function of the threshold circuit 56 is to convert each such analog value into a corresponding two bit value for each pixel. In this regard, a binary zero for a pixel indicates a dark or printed area of a document 18 and a binary one indicates a light or background area thereon. Additional details of the threshold circuit 56 will be described hereinafter.

The output from the threshold circuit 56 (FIG. 3) is fed into a document detect circuit 58. The function of the detect circuit 58 is to utilize the output of the imaging device 24 (FIG. 1) to detect the leading edge of a document 18 when it passes the imaging device 24. In this way, a separate document detector is eliminated from the system 10. The document detect circuit 58 may be conventional in that it includes logic circuitry to determine when 30 out of the 64 pixels in a scanning line are white; this indicates the start of a new document. A start of document signal (MCRSOD) from the document detect circuit 58 is utilized by the image buffer 34 to initiate storing the image data for a new document 18 so that image data about that document can be withdrawn for viewing on the display 26 as discussed earlier herein. The end of the document 18 is determined by a timer (not shown) whose total time is equivalent to the total elapsed time for a document 18 (which is nine and one-half inches long) to pass the imaging device 24. A document 18 which is nine and one-half inches long represents the longest document anticipated by the system 10. A document 18 which has a length less than the longest dimension anticipated would have useless data stored in the image buffer 34 from the end of the document itself until the timer mentioned reached its maximum elapsed time and thereby ended the storage of data in the image buffer 34 for that document 18.

The CLD circuit 30 also includes the synchronizing circuit designated generally as 60. One function of the circuit 60 is to provide a delay time which corresponds to the time that a location on a document 18 takes in being moved in the document track 12 from the read head 22 (FIG. 1) to the imaging device 24 to enable the marker 36 (FIG. 2) to be positioned over the rejected character on the display 26. Another function of the circuit 60 is to synchronize the 64 outputs or pixels from the video array 50 so that the marker 36 is positioned in the 64th pixel for each scan when it is supposed to appear. In the embodiment described, the marker 36 is positioned on the display 26 in eight scans (like 36-1 through 36-8 in FIG. 4) out of the 20 scans which relate to one character for the MICR data.

With regard to the synchronizing circuit 60 providing the delay time mentioned in the previous paragraph, it is necessary that the circuit 60 be capable of handling multiple reject signals for a document 18. In this regard, a MICR Reject signal coming from the read circuit 28 is fed into a first shift register means 62 so as to get it, conventionally, in the proper time relation with the shift register 64. The shift register means 62 and the shift register 64 are shifted by clock 1 and clock 2, respectively, coming from the clock generator 42. Clock 2 has a frequency which enables a MICR Reject signal to be stepped through the shift register 64 for a total elapsed time which corresponds to the elapsed time for a point on a document 18 to travel from the read head 22 to the imaging device 24 as previously described. In the embodiment described, this elapsed time is about ten milliseconds. The shift register 64 is clocked all the time, so that if there is no MICR Reject signal for a document 18, a binary zero will be stepped through the shift register 64 for each character position on the MICR line of data being read. As soon as a MICR character is not read, a MICR Reject signal occurs for that character position, and a binary one is entered into the shift register 64 and stepped therethrough by the clock 2. If two MICR characters in succession were not read properly, two successive MICR Reject signals or binary ones would be stepped through the shift register 64 so that each MICR Reject signal would be delayed for ten milliseconds, in the example being described, prior to emerging from the output side of the register 64.

When a binary one output occurs at the output of shift register 64 (FIG. 3), indicating the need to show a marker 36 on the display 26, the output is fed into a latch 66 where it is latched. A counter 68 is utilized to provide signals for eight pulses for placing the marker 36 (36-1 through 36-8) above the rejected character on the display 26. In this regard, there are 64 pixels coming from the video array 50 in the embodiment described. The 63rd pixel (near to top of the scan) is kept blank, and the 64th pixel is reserved for the marker 36. The MCRSYN signal, coming from the decoder 52, occurs every 64th pixel and is used by conventional logic circuitry (L.C.) 70 to place a binary one in the 64th pixel for that scan when a MICR Reject signal occurs. The usual image data coming from the threshold circuit 56 also passes through the logic circuitry 70 to the image buffer 34 where the data is stored by scans for each document 18. When a count of eight is reached on the counter 68, the logic circuitry 70 causes a binary zero to be placed in the 64th pixel location for subsequent scans. Should another character on the MICR line of data be rejected by the read circuit 28 (FIG. 1), another MICR Reject signal will be generated to repeat the process just described.

Figure 5:
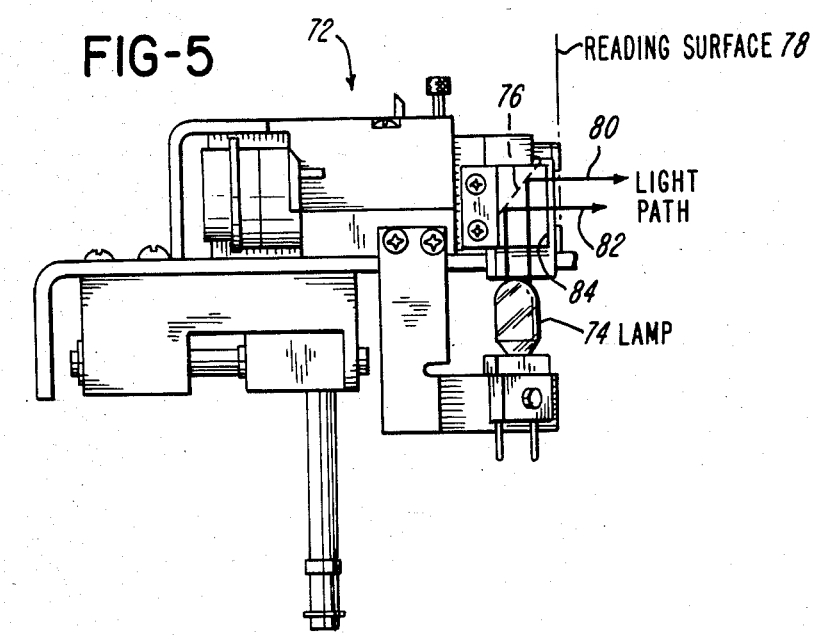
FIG. 5 is an end view, taken from the direction of arrow A in FIG. 1, to show additional details of the imaging device shown therein.

Another feature of this invention relates to the compact imaging head 72 (FIG. 5) which is included in the imaging device 24 shown in FIG. 1. Light from the lamp 74 is reflected off a reflecting prism or mirror 76 (shown as a dashed line) towards the reading surface 78 where it illuminates a document 18 to be read. In FIG. 5, the leading edge of a document 18 (if shown) would come out of the plane of FIG. 5 directly at an individual viewing this figure.

Figure 6:
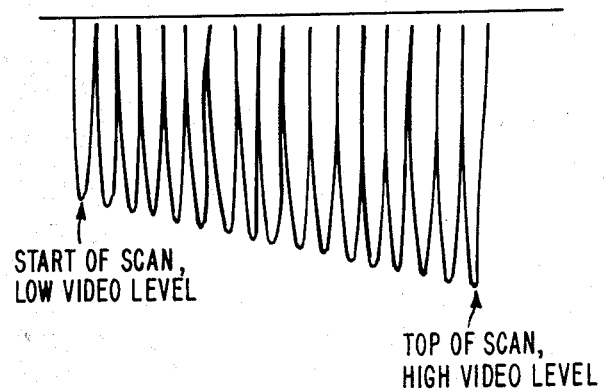
FIG. 6 is a waveform representing the light intensity along a scan line of the imaging head shown in FIG. 5 when a uniform white background is scanned.

One problem with using the type of imaging head 72 shown in FIG. 5 is that the light intensity directed at the reading surface 78 is not constant over the entire height of the associated scanning line. In this regard, the light intensity near the top of the scanning line as represented by arrow 80 is greater than the light intensity near the bottom of the scanning line as represented by arrow 82. Normally, one would expect the light intensity to be greater along the lower path indicated by arrow 82 than along the upper path indicated by arrow 80 because the lower path is closer to the lamp 74 than is the upper path; however, this is not so, as previously stated. One explanation might be that the mirror 76 is located in a housing 84 which tends to direct the light from the lamp 74 to the mirror 76 and that little light is lost in reaching the mirror 76. Once the light is reflected from the mirror 76, the light along arrow 80 (near the top of the scanning line) has a shorter distance to travel to the reading surface 78 than does the light along arrow 82, near the bottom of the scanning line. In this regard, FIG. 6 represents the outputs of the pixels of the video array 50 in a scanning line for light reflected from a uniform white background. In the embodiment described in FIG. 6, the base voltage is zero and the amplitude increases towards a minus one or two volts. In other words, a black portion of the document is a binary zero and a white portion is a binary minus one or two volts. The left side of FIG. 6 represents the start of the scan or the bottom of the scanning line while the right side of this figure represents the top of the scan. Notice, that the level of outputs shown in FIG. 6 increases towards the top of the scanning line. The imaging head 72 contains conventional optics (not shown) to transfer the light reflected from a document positioned at the reading surface 78 to the video array 50 which is mounted within the imaging head 72.

FIG. 7A represents a waveform obtained from a single scan wherein the character or number "0" (shown in FIG. 7B) is positioned at the scanning line (represented by dashed line 86) of the imaging device 24. The scanning at the scanning line (dashed line 86 in FIG. 7B) proceeds from the bottom to the top as viewed in FIG. 7B. In the embodiment described, the lighter or brighter an area is on a document 18, the greater will be the output of the associated pixels. Notice that the bottom character portion of the number "0" in FIG. 7B is lower in output than the background of the associated document 18 which is not shown in FIG. 7B; arrow 88 in FIG. 7B points to a black pixel output 90 in FIG. 7A. Notice that the black pixel output 90 is lower in value than its adjacent "white pixel" outputs 92 and 94 which represent the background on the document 18. A second black pixel output 96 (FIG. 7A), pointed to by arrow 98, corresponds to the upper character portion of the number "0" which lies on the scanning line 86.

When a fixed threshold established by a threshold circuit is used, errors in reading may be introduced. For example, those pixel outputs like 100, 102, 104, and 106 (FIG. 7A) are, in reality, "white" pixel outputs; however, they do not appear as white pixel outputs on the digitized waveform shown in FIG. 7C. This is because the pixel outputs like 100 and 106 are below the fixed threshold represented by dashed line 108. Pixel output 110, which is equal to the threshold 108, corresponds to the digitized output 110-1 shown in FIG. 7C. FIGS. 7A, 7C, and 7D are aligned in a vertical direction to facilitate a comparison of the digitized outputs of FIGS. 7C and 7D with the corresponding analog outputs shown in FIG. 7A.

When the variable threshold is established by the threshold circuit 56 shown in FIG. 3, more correct readings result. For example, the compensated or variable threshold developed by the circuit 56 is shown as dashed line 112 in FIG. 7A. Notice that the pixel outputs 100, 102, and 104 up to 106 are greater than the compensated threshold 112, and correspondingly, these outputs are properly recorded as white pixels 100-1, 102-1, 104-1 and 106-1 in FIG. 7D. The black pixel outputs 90 and 96 shown in FIG. 7A correspond to the low values shown at areas 94-1 and 96-1 in FIG. 7D. Whether a black pixel output is shown as a binary zero or a binary one is a matter of design.

The threshold circuit 56, alluded to with regard to FIG. 3, is shown in more detail in FIG. 8. As previously stated, the general function of the threshold circuit 56 (FIG. 3) is to convert the analog value of each pixel in the scanning line to a binary value of either a "one" or a "zero". An additional function of the threshold circuit 56 is to improve the accuracy of reading by providing a circuit which compensates for the varying intensity of light at the reading surface 78 as discussed in relation to the compact imaging head 72 shown in FIG. 5.

In order to simplify the description of a particular embodiment of the circuit 56, all the components are identified with specific values or circuit numbers on FIG. 8 itself; therefore, a discussion of specific values or circuit numbers will not be given in the description except where such discussion is necessary for an understanding of the operation of the circuit. In addition, the circuit numbers given are generic circuit numbers; for example, the generic circuit number for circuit U2-1 is "PLM319". Circuit PLM 319 is an open collector buffer or operational amplifier and is manufactured by a variety of producers, like Texas Instruments, for example.

To continue with a description of the threshold circuit 56 (FIG. 8), this circuit receives the video data on conductor 114 which is connected to the video amplifier 54 (FIG. 3). The capacitor C6 connected to the conductor 114, the resistor R14, the diode CR3, the resistor R9, the resistor R2, and the transistor Q3 are used to establish a bias level for the video signal coming in on conductor 114. Resistor R8, which is connected to a voltage source of five volts, is used for holding the voltage level up for driving transistor Q3 when a clocking pulse occurs on the base of transistor Q3. The video signal on conductor 114 is fed into the input (pin 4) of circuit U2-1 which is an open collector buffer or op amplifier as previously described. The output of circuit U2-1 (pin 12) is used to charge the capacitor C4 through a charging resistor RI. The associated charging time is established by a time constant determined by resistor R1 and capacitor C4. In the embodiment described, a black pixel is equal to a base or zero voltage, and a white pixel is equal to a negative voltage.

To begin the explanation relative to capacitor C4, it seems appropriate to discuss its state when it is completely discharged. In this regard, a Start/ signal which is derived from the Start signal (from decoder 52 in FIG. 3) is used to initiate the discharge of capacitor C4. It should be recalled that the Start signal is derived from the 66th "pixel" or clocking pulse in a scanning line while only the pixels from #1 through #64 in the scanning line are used for video data. The Start/ signal on conductor 116 is fed into circuit U5-1 which is an open collector driver. Circuit U5-2, which is also an open collector driver, circuit U5-1, resistors R11, R12, and R5, and diode CR2 are used to drive the transistor Q1 into conduction (when the Start/ signal is active) to thereby discharge capacitor C4 to zero volts before the start of the first pixel coming from the start of a new scanning line. After capacitor C4 is discharged, transistor Q1 is turned off by the Start/ signal returning to an inactive level; this allows the capacitor C4 to be driven to a level determined by the voltage level of the incoming video signal.

When the video signal from the first pixel in a new scanning line comes over conductor 114 in the example described, it begins to charge capacitor C4 up to a certain level. Capacitor C4 is not a polarized capacitor although the side of capacitor C4 which is connected to ground may be considered as the "positive" side. The time constant for charging capacitor C4 is based on resistor R1 and the capacity of capacitor C4. When the video signal for the first pixel subsides, the capacitor C4 will maintain the charge that it received; during this time, the circuit U2-1 is essentially turned off because it is an open collector type. Consequently, resistor R1 is left floating. At this time, resistor R4 and capacitor C4 establish the discharge rate for the capacitor C4. Notice that the size of discharging resistor R4 is considerably larger (56K ohms) than resistor R1. This means that the capacitor C4 will be charged more quickly through resistor R1 than it will be discharged through resistor R4. This is a feature of this invention in that in the normal case, the intensity of the light increases as scanning progresses from the bottom of the scanning line to the top thereof as previously explained; however, there are some situations in which the light intensity may become less as scanning progresses towards the top of the scanning line. This may be due to power fluctuations to the lamp 74 (FIG. 5), for example, which would cause a light output which is not increasing but is decreasing. In this situation, it would be desirable to have the threshold level, which is being established by the charge on the capacitor C4, lowered slightly; this is accomplished by discharging capacitor C4 through resistor R4. Circuit U2-1 provides an output which is monotonic in that it produces an output on pin 12 only when the incoming analog pixel or video data on its pin 4 is greater in value than the video data for the prior analog pixel on its pin 5. This updating of the charge on capacitor C4 is continued for all pixel data through the data for the 64th pixel in a scanning line. After the capacitor C4 is discharged at the end of a scan line, the process described herein is repeated for the next scan line. Essentially, the threshold circuit 56 adjusts the threshold for each scan line.

During the scanning by the imaging head 72, the output voltage of the capacitor C4 (for thresholding) is fed into the input pin 3 of an operational amplifier or op amp U3 (FIG. 8) where the output voltage is added to a D.C. voltage level which is applied to pin 2 of op amp U3. The output (pin 6) of the op amp U3 carries the total threshold voltage which is fed into the input (pin 10) of an op amp U2-2 which is identical to op amp U2-1. The D.C. voltage level added to op amp U3 is used, basically, to reject noise. The output of the op amp U3, which is fed into the input (pin 10) of the op amp U2-2, is compared with the incoming video signal which is coupled to pin 9 of the comparator or op amp U3 to produce either a binary zero (black pixel) or a binary 1 (white pixel) on the output (pin 7) of the op amp U2-2. The binary 1 or zero from op amp U2-2 is fed into a latch U9 when clocked by a clock signal on conductor 118. The output of the latch U9 of the threshold circuit 56 is fed into the synchronizing circuit 60 already discussed in relation to FIG. 3.

It should be recalled from the discussion made earlier herein that there are only 64 pixels of data in each scan in the embodiment described, and that pixels #65 and #66 at the top of the scanning line do not contain useful data at the time of scanning. The buffer U5-2 (FIG. 8) is used to prevent extraneous data from entering the system 10 during the time after the scanning of the 64th pixel until the scanning of the 1st pixel at the start of the next successive scan line. In this regard, the buffer U5-2 and its associated resistors R10 and Z1 and capacitor C7 are used to force a signal on the "set" input (pin 4) of the latch U9 which is analogous to a white pixel signal or "no data" being received from op amp U2-2.

Another feature of the threshold circuit 56 (FIG. 8) is that is has a means for setting its sensitivity level so as to accommodate two different known fonts of MICR printing, namely the E13B font and the CMC7 font. The basic difference between the two fonts as far as thresholding is concerned is that the E13B font has darker printing than does the CMC7 font In order to set the sensitivity level of the threshold circuit 56 (FIG. 8), the switch SW1 is used. When switch SW1 is in the open position shown, resistor R14 alone is used to set the level of sensitivity of op amp U2-1; this open switch position is used for the darker E13B font. When switch SW1 is closed, resistor R20 is placed in parallel with resistor R14, thereby lowering the resistance to the input pin 4 of op amp U2-1 to increase its sensitivity. The closed position of switch SW1 is used for the lighter CMC7 font.

Figure 9:
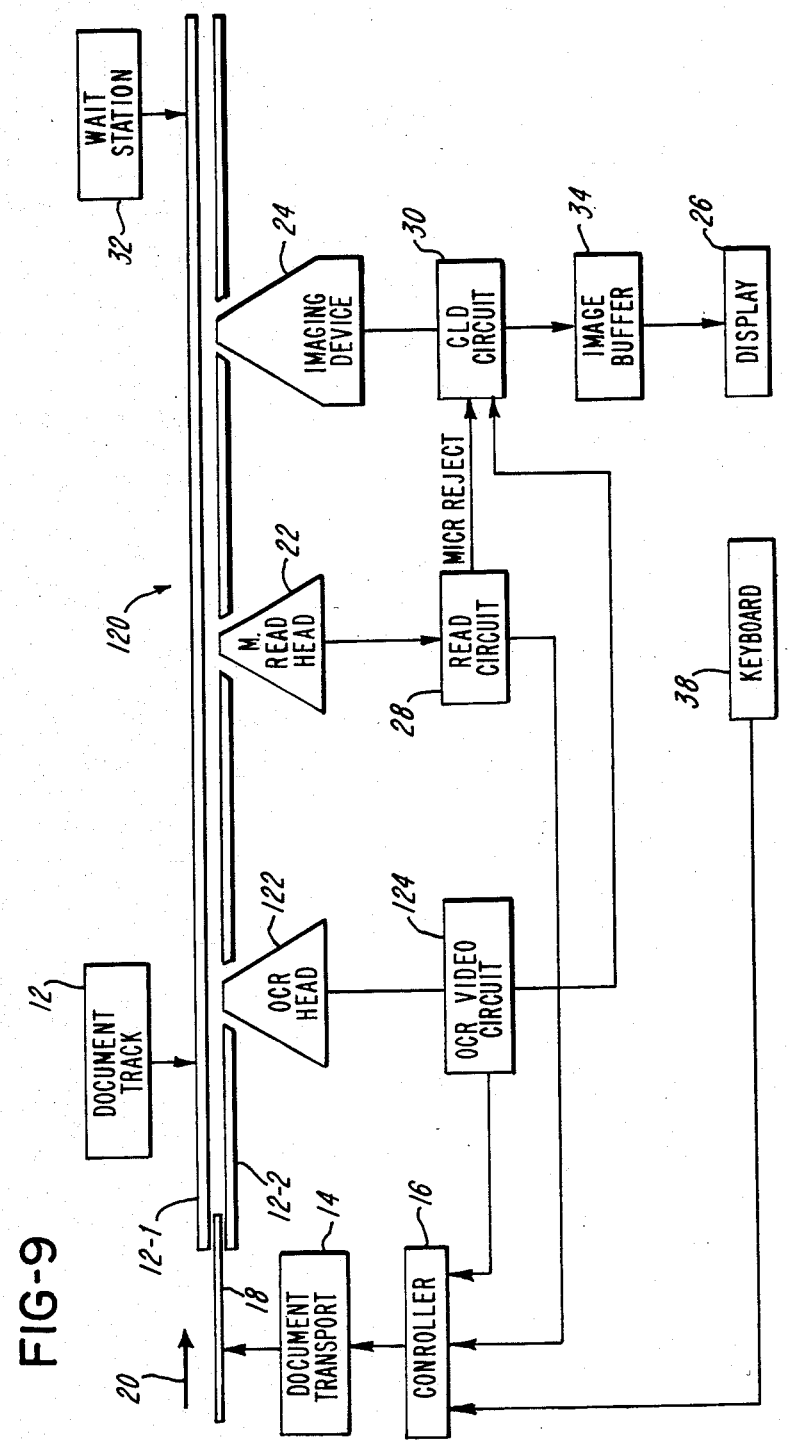
FIG. 9 is a view similar to FIG. 1 but showing a second embodiment of this invention.

A second embodiment of this invention is shown in FIG. 9, and it is designated generally as system 120. The system 120 uses many of the same components shown in system 10, and accordingly, the same components used in system 120 are given the same reference numerals as the corresponding components in system 10 shown in FIG. 1.

A principal difference between system 10 shown in FIG. 1 and the system 120 shown in FIG. 9 is that system 120 has a separate optical character recognition (OCR) head 122 and an OCR video circuit 124; otherwise, the systems 10 and 120 are essentially the same. The OCR head 122 is essentially the same as the imaging device 24 except that the OCR head 122 provides a finer resolution than does the imaging device 24. The finer resolution for OCR head 122 is necessary to enable the data to be read by the OCR video circuit 124 The data which is scanned by the OCR head 122 includes general data about the document including the monetary amount of the documents 18 as is scanned during a remittance processing procedure The monetary amount is located near the right side of the front of the document 18 and about half way up from the long, lower side of the document where the MICR data is located.

The OCR video circuit 124 (FIG. 9) may be conventional, and its digital binary output is fed to the image buffer 34 through the CLD circuit 30. The image buffer 34 stores the binary data for two images in separate sections thereof. The first image (MICR) is the one obtained from the CLD circuit 30 in FIG. 3 as previously described, and the second image (monetary amount) is the one obtained from the OCR video circuit 124. As seen in FIG. 9, the OCR head 122 and the imaging device 24 are displaced along the document track 12. Accordingly, the first and second images mentioned are not processed at the same time; however, the resulting first and second images are placed in separate sections of the image buffer 34 for each document.

To assist in the processing of documents 18 by the system 120 shown in FIG. 9, there is application software associated with the controller 16. It should be recalled that the monetary amount has already been encoded on the MICR line on the documents in a previous operation. In the embodiment described, the application software mentioned is used to display the MICR image first on the display 26, and thereafter, if needed, the OCR data from the OCR head 122 may be displayed for that document 18.

What is claimed is:

1. A document processing system comprising:

a document track and mving means for moving documents in a feeding direction at a constant velocity serially in spaced relation along said document track;

reading means including a read head for reading a line of character data from said documents being moved in said document track;

an imaging means positioned downstream along said feeding direction from said read head for generating image data of at least a portion of each of said documents including said line of character data passing said reading means;

said reading means also including a read circuit for reading said line of character data and also for determining when a particular character in said line of character data on a document is not read correctly and for issuing a reject signal in response thereto;

a display circuit for receiving said image data from said image means and for converting said image data to binary data;

said display circuit also receiving said reject signal and geneating a marker which indicates the position in said binary data of a rejected character in said line of character data;

a buffer for storing said binary data and said marker for each said document; and a display coupled to said buffer for displaying said binary data and said marker for a said line of character data to facilitate the entry of the data;

said display circuit also including delaying means for delaying each said reject signal by a fixed amount of time which corresponds to the time that a location on a said document takes in being moved physically from said reading means to said imaging means to enable said marker to be positioned adjacent to the corresponding said rejected character when displayed on said display.

2. The document processing system as claimed in claim 1 in which said imaging means includes a lamp and a mirror positioned relative to said lamp and said document track to reflect light from said lamp along a scanning line to said line of character data;

said scanning line having first and second ends whereby the light intensity from said lamp and mirror is greater at said second end than at said first end of said scanning line; and said display circuit including a threshold circuit for converting said image data from said imaging means to said binary data;

said threshold circuit including compensating means for adjusting the threshold level of said threshold circuit in accordance with said light intensity.

3. The document processing system as claimed in claim 2 in which said compensating means includes a capacitor and a charging resistor for increasing said threshold level by increasing a charge on said capacitor as said light intensity increases and also includes a discharging resistor for decreasing said charge on said capacitor as said light intensity decreases.

4. The document processing system as claimed in claim 3 in which said discharging resistor has a value which is considerably larger than the value of said charging resistor.

5. The document processing system as claimed in claim 4 in which said image data is generated in the form of an analog value for each pixel in a line of pixels formed along said scanning line, and in which said display circuit includes a detect circuit which receives said binary data which corresponds to said image data for a line of pixels and which also detects a leading edge of a said document at said imaging means by comparing the number of binary ones with the number of binary zeros in the binary data corresponding to the image data for a line of pixels.

6. The document processing system as claimed in claim 5 in which said delaying means includes a shift register, whereby successive said reject signals may each be delayed by said fixed amount of time.

7. The document processing system as claimed in claim 6 in which said line of character data is MICR data and said reading means is used for reading said MICR data.

8. The document processing system as claimed in claim 1 in which said delaying means includes a shift register, whereby successive said reject signals may each be delayed by said fixed amount of time.

9. The document processing system as claimed in claim 1 in which said line of character data is MICR data and said reading means is used for reading said MICR data.

10. The document processing system as claimed in claim 9 in which a said rejected character on said display has a cell width corresponding to a predetermined number of successive lines of pixels and said marker extends over approximately two fifths of said predetermined number of successive lines of pixels.

11. A document processing system comprising:

a document track and moving means for moving documents in a feeding direction at a constant velocity serially in spaced relation along said document track;

reading means including a read head for reading a line of character data from said documents being moved in said document track;

an imaging means positioned downstream along said feeding direction from said read head for generating image data of at least a portion of each of said documents including said line of character data passing said reading means;

said reading means also including a read circuit for determining when a particular character in said line of character data on a document is not read correctly and for issuing a reject signal in response thereto;

a display circuit for receiving said image data from said imaging means and for converting said image data to binary data;

said display circuit also receiving said reject signal and generating a marker which indicates the position in said binary data of a rejected character in said line of character data;

a buffer for storing said binary data and said marker for each said document;

a display coupled to said buffer for displaying said binary data and said marker for a said line of character data to facilitate the entry of the data;

said display circuit also including means for delaying each said reject signal by a fixed amount of time which corresponds to the time that a location on a said document takes in being moved physically from said reading means to said imaging means to enable said marker to be positioned adjacent to the corresponding said rejected character when displayed on said display.

a controller coupled to said read circuit and said display for controlling said system; and a keyboard coupled to said controller for entering corrections into said system.

12. The document processing system as claimed in claim 11 in which said imaging means includes a lamp and a mirror positioned relative to said lamp and said document track to reflect light from said lamp along a scanning line to said line of character data;

said scanning line having first and second ends whereby the light intensity from said lamp and mirror is greater at said second end than at said first end of said scanning line; and said display circuit including a threshold circuit for converting said image data from said imaging means to said binary data;

said threshold circuit including compensating means for adjusting the threshold level of said threshold circuit in accordance with said light intensity.

13. The document processing system as claimed in claim 12 in which said delaying means includes a shift register, whereby successive said reject signals may each be delayed by said fixed amount of time.

14. A document processing system comprising:

a document track and moving means for moving documents in a feeding direction at a constant velocity serially in spaced relation along said document track;

first imaging means for generating image data of at least a portion of each of said documents including the monetary amount on each said document;

a video circuit for receiving said image data from said first imaging means and for converting said image data to binary data;

reading means including a read head for reading a line of character data from said documents being moved in said document track;

said reading means being located downstream along said feeding direction from said first imaging means;

a second imaging means positioned downstream along said feeding direction from said read head for generating image data of at least a portion of each of said documents including said line of character data passing said reading means;

said reading means also including a read circuit for determining when a particular character in said line of character data on a document is not read correctly and for issuing a reject signal in response thereto;

a display circuit for receiving said image data from said second imaging means for for converting said image data to binary data;

said display circuit also receiving said reject signal and generating a marker which indicates the position in said binary data of a rejected character in said line of character data;

a buffer for storing said binary data from said video circuit and from said second imaging means and also for storing said marker for each said document; and a display coupled to said buffer for displaying said binary data from said video circuit and also for displaying said binary data and said marker for a said line of character data to facilitate the entry of data;

said display circuit also including means for delaying each said reject signal by a fixed amount of time which corresponds to the time that a location on a said document takes in being moved physically from said reading means to said imaging means to enable said marker to be positioned adjacent to the corresponding said rejected character when displayed on said display;

a controller coupled to said read circuit and said display for controlling said system; and a keyboard coupled to said controller for selecting that said binary data from said video circuit or from said second imaging means which is to be displayed on said display and also for entering data into said system.

15. The document processing system as claimed in claim 14 in which said second imaging means includes a lamp and a mirror positioned relative to said lamp and said document track to reflect light from said lamp along a scanning line to said line of character data;

said scanning line having first and second ends whereby the light intensity from said lamp and mirror is greater at said second end than at said first end of said scanning line; and said display circuit including a threshold circuit for converting said image data from said imaging means to said binary data;.

said threshold circuit including compensating means for adjusting the threshold level of said threshold circuit in accordance with said light intensity.

16. The document processing system as claimed in claim 15 in which said compensating means includes a capacitor and a charging resistor for increasing said threshold level by increasing a charge on said capacitor as said light intensity increases and also includes a discharging resistor for decreasing said charge on said capacitor as said light intensity decreases.

17. The document processing system as claimed in claim 16 in which said discharging resistor has a value which is considerably larger than the value of said charging resistor.

18. The document processing system as claimed in claim 17 in which said delaying means includes a shift register, whereby successive said reject signals may each be delayed by said fixed amount of time.

19. The document processing system as claimed in claim 18 in which said line of character data is MICR data and said reading means is used for reading said MICR data.

* * * * *

UNITED STATES PATENT AND TRADEMARK OFFICE
CERTIFICATE OF CORRECTION

PATENT NO. : 4,747,058
DATED : May 24, 1988
INVENTOR(S) : Benedict C. M. Ho

It is certified that error appears in the above—identified patent and that said Letters Patent is hereby corrected as shown below:

Column 11, line 10, delete "mving" and substitute --moving--.

Column 11, line 32, delete "geneating" and substitute --generating--.

Column 14, line 2, delete "for" (first occurrence) and substitute --and--.

Signed and Sealed this

Eighteenth Day of October, 1988

*Attest:*

DONALD J. QUIGG

*Attesting Officer*  *Commissioner of Patents and Trademarks*